(No Model.)
W. STEUERWALD.
Machine for Packing Meats into Cans.
No. 227,854. Patented May 18, 1880.
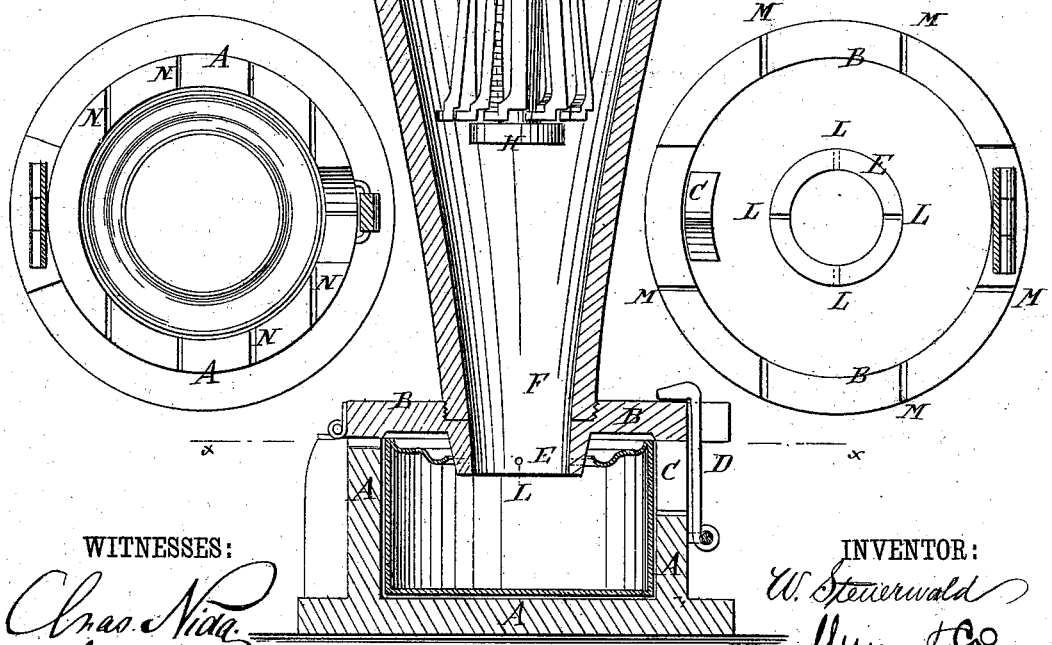
WITNESSES:
Chas. Nida
C. Sedgwick
INVENTOR:
W. Steuerwald
BY Munn & Co.
ATTORNEYS.
N. PETERS, PHOTO-LITHOGRAPHER, WASHINGTON, D.C.

UNITED STATES PATENT OFFICE.

WILLIAM STEUERWALD, OF NEW YORK, N. Y.

MACHINE FOR PACKING MEATS INTO CANS.

SPECIFICATION forming part of Letters Patent No. 227,854, dated May 18, 1880.

Application filed April 7, 1880. (No model.)

*To all whom it may concern:*

Be it known that I, WILLIAM STEUERWALD, of the city, county, and State of New York, have invented a new and useful Improvement in Machines for Packing Meats into Cans, of which the following is a specification.

Figure 1 is a sectional elevation of the improvement. Fig. 2 is a cross-section taken through the line $x\ x$, Fig. 1, looking downward. Fig. 3 is a cross-section taken through the line $x\ x$, Fig. 1, looking upward. Fig. 4 is a cross-section taken through the line $y\ y$, Fig. 1, looking upward. Fig. 5 is an end view of the follower.

Similar letters of reference indicate corresponding parts.

The object of this invention is to furnish machines for packing meats into cans, which shall be so constructed as to fill a can at one descent of the follower, and which shall be simple in construction and convenient in use.

The invention consists in constructing a machine for packing meat into cans of a holder to receive the can, a top having a tapering tube to enter the hole in the can, a tapering hopper, and a contractible follower for forcing the meat into the can at a single movement, as will be hereinafter fully described.

A represents a socket or frame to receive the can and hold it while being filled, and which is designed to be secured to a bench or table. To one side of the holder A, or to a support or projection attached to or formed upon one side of the said holder, is hinged a cover or top, B, which has a V-shaped projection, C, formed upon the lower side of its forward part, to enter a V-shaped notch in the holder A, to center the top B as it is swung down. The top B is secured when closed by a catch-hook, D, attached to the holder A, and entering a notch in the said top B, or by other suitable means.

Upon the lower side of the top B is formed, or to it is attached, a short tapering tube, E, of such a size and length as to enter and fit into the hole in the top of the can.

F is a funnel-shaped hopper, the lower end of which is formed upon or firmly attached to the top B, and the inner surface of the said lower end coincides with the inner surface of the tube E.

G is the follower or plunger-shaft, upon the lower end of which is formed a circular head, H. The lower part of the follower-shaft G is surrounded by a series of springs, I, the upper ends of which are inserted in sockets or notches formed in a shoulder, J, formed upon the upper part of the shaft G, where they are secured in place by a band or collar, K, placed upon them, as shown in Figs. 1 and 4. The springs I are so formed as to flare outward toward their lower ends, as shown in Fig. 1, and their lower ends have a projection upon one side and a corresponding recess in the other side, as shown in Fig. 1, so that the said ends may overlap each other, to prevent the meat from getting in between the springs I when the follower is forced down. The springs I are made of such a length that their lower ends may overlap and close in up on the upper side of the head H.

With this construction, as the follower is forced downward, the tapering sides of the hopper F press the lower ends of the springs I inward, so that the said follower will always fill the cavity of the said hopper and force all the meat contained in the said hopper into the can.

In the lower part of the tube E are formed small holes L, to allow the air in the can to pass into the tube E and escape through the spaces between the springs I. The air can also escape through the grooves M in the lower side of the top B, and through grooves N in the upper edge of the holder A.

The upper end of the follower-shaft G is designed to be attached to a cross-head which slides in ways and is operated by a lever or other suitable means.

In using the machine, the proper quantity of meat is weighed out and is placed in the hopper F, and the follower is forced down, forcing the whole of the meat through the tube E into the can at a single operation, so that the cans can be filled very rapidly.

Having thus fully described my invention, I claim as new and desire to secure by Letters Patent—

1. In a machine for packing meats into cans, the follower constructed substantially as herein shown and described, consisting of the shaft G, having a head, H, upon its lower end, and the flaring springs I, having overlapping lower ends, whereby the follower can adjust itself to a tapering hopper, as set forth.

2. A machine for packing meats into cans, constructed substantially as herein shown and described, consisting of the can-holder A, the hinged top B, carrying the tube E and hopper F, and the contractible follower G H I, whereby the meat can be forced into a can at a single operation, as set forth.

3. In a machine for packing meat into cans, the tube E, having holes L through the part that enters the can, substantially as herein shown and described, to allow the air in the can to pass into the tube E and escape through the spaces between the springs I of the follower as the meat is pressed into the can, as set forth.

4. In a machine for packing meat into cans, the holder A and top B, having grooves M N in their adjacent parts, substantially as herein shown and described, whereby the air is allowed to escape as the meat is forced into the can, as set forth.

WM. STEUERWALD.

Witnesses:
 JAMES T. GRAHAM,
 JAMES H. HUNTER.